(12) United States Patent
Jiang

(10) Patent No.: US 7,830,653 B2
(45) Date of Patent: Nov. 9, 2010

(54) COMPUTER DEVICE FIXING APPARATUS AND COMPUTER CASE UTILIZING SAID APPARATUS

(75) Inventor: Yue-Wen Jiang, Taipei (TW)

(73) Assignee: Lite-On Technology Corp., Taipei (TW)

( * ) Notice: Subject to any disclaimer, the term of this patent is extended or adjusted under 35 U.S.C. 154(b) by 265 days.

(21) Appl. No.: 12/043,140

(22) Filed: Mar. 6, 2008

(65) Prior Publication Data

US 2008/0278906 A1    Nov. 13, 2008

Related U.S. Application Data

(60) Provisional application No. 60/917,069, filed on May 10, 2007.

(51) Int. Cl.
  *G06F 1/16* (2006.01)
  *A47B 81/00* (2006.01)
  *A47F 7/00* (2006.01)

(52) U.S. Cl. ............... 361/679.33; 361/679.31; 361/679.37; 312/223.2; 211/26

(58) Field of Classification Search ............... 361/679.01–679.45, 679.55–679.59, 724–727; 312/223.1, 223.2, 205; 211/26
See application file for complete search history.

(56) References Cited

U.S. PATENT DOCUMENTS

| 5,784,251 | A | * | 7/1998 | Miller et al. | 361/679.6 |
| 6,460,947 | B1 | * | 10/2002 | Wah | 312/205 |
| 2004/0114321 | A1 | * | 6/2004 | Roh | 361/685 |

* cited by examiner

*Primary Examiner*—Jayprakash N Gandhi
*Assistant Examiner*—Nidhi Desai
(74) *Attorney, Agent, or Firm*—Rosenberg, Klein & Lee

(57) ABSTRACT

A computer device fixing apparatus includes: a main body part, having a containing part; an adjusting mechanism; and a connection mechanism, by which the main body part is connected with the adjusting mechanism revolvably; wherein the computer device fixing apparatus is for fixing a computer device of a first size when the adjusting mechanism is located in the containing part, and the computer device fixing apparatus is for fixing a computer device of a second size when the adjusting mechanism is not located in the containing part. The adjusting mechanism can be utilized to compensate for the height difference between two sizes of computer devices if the computer device of a first height has a larger height than the computer device of a second height, thereby two computer devices with different sizes can be fixed by the same computer device fixing apparatus.

10 Claims, 8 Drawing Sheets

COMPUTER DEVICE FIXING APPARATUS AND COMPUTER CASE UTILIZING SAID APPARATUS

CROSS REFERENCE TO RELATED APPLICATIONS

This application claims the benefit of U.S. Provisional Application No. 60/917,069, filed on May 10, 2007 and entitled "COMPUTER COMPONENT DEVICE FIXING MECHANISM", the contents of which are incorporated herein by reference.

BACKGROUND OF THE INVENTION

1. Field of the Invention

The present invention relates to a computer device fixing apparatus and a computer case utilizing the computer device fixing apparatus, and particularly relates to a hard disk fixing apparatus and a computer case utilizing the hard disk fixing apparatus.

2. Description of the Prior Art

Conventionally, a storage apparatus such as a hard disk requires fixing devices such as screws to affix it to a computer case. Such a structure is inconvenient for a user when he/she wishes to open up the computer to add extra memory, for example. The user requires tools such as screwdrivers to open the computer, and the screws, being small, are easily lost when they are removed from the computer case. Furthermore, if a user utilizes tools when opening up the computer, the tool may accidentally contact circuits of the computer, causing a short or destruction of the circuits in severe cases. The cost of the screws is also an issue for a manufacturer.

Improvements in technology have given rise to many different sizes of computer devices. For example, hard disks can be divided into 3.5 inch and 2.5 inch sizes. A traditional computer case that can only accept a computer device of a certain size cannot meet the requirement, however.

SUMMARY OF THE INVENTION

Thus, one objective of the present invention is to provide a computer device fixing apparatus and a computer case utilizing the computer device fixing apparatus. This enables a user to easily modify or remove computer devices. Moreover, the computer device fixing apparatus according to the present invention is not limited to a single size, so the application range of the computer device fixing apparatus increases.

One embodiment of the present invention discloses a computer device fixing apparatus, comprising: a main body part, including a containing part; an adjusting mechanism; and a connection mechanism, for connecting the main body part and the adjusting mechanism, by which the main body part is connected with the adjusting mechanism revolvably; wherein the computer device fixing apparatus is for fixing a computer device of a first size when the adjusting mechanism is located in the containing part, and the computer device fixing apparatus is for fixing a computer device of a second size when the adjusting mechanism is not located in the containing part.

Another embodiment of the present invention discloses a computer case, including a computer device fixing apparatus comprising: a main body part, located on the computer case and including a containing part; an adjusting mechanism; and a connection mechanism, for connecting the main body part and the adjusting mechanism, by which the main body part is connected with the adjusting mechanism revolvably; wherein the computer device fixing apparatus is for fixing a computer device of a first size when the adjusting mechanism is located in the containing part, and the computer device fixing apparatus is for fixing a computer device of a second size when the adjusting mechanism is not located in the containing part.

According to the above-mentioned structures, the computer device fixing apparatus has the following advantages: removing the need for screws will decrease the probability of a computer circuit short occurring and increases the convenience for a user. Also, computer devices of different sizes can be affixed to the computer case via the single computer device fixing apparatus.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
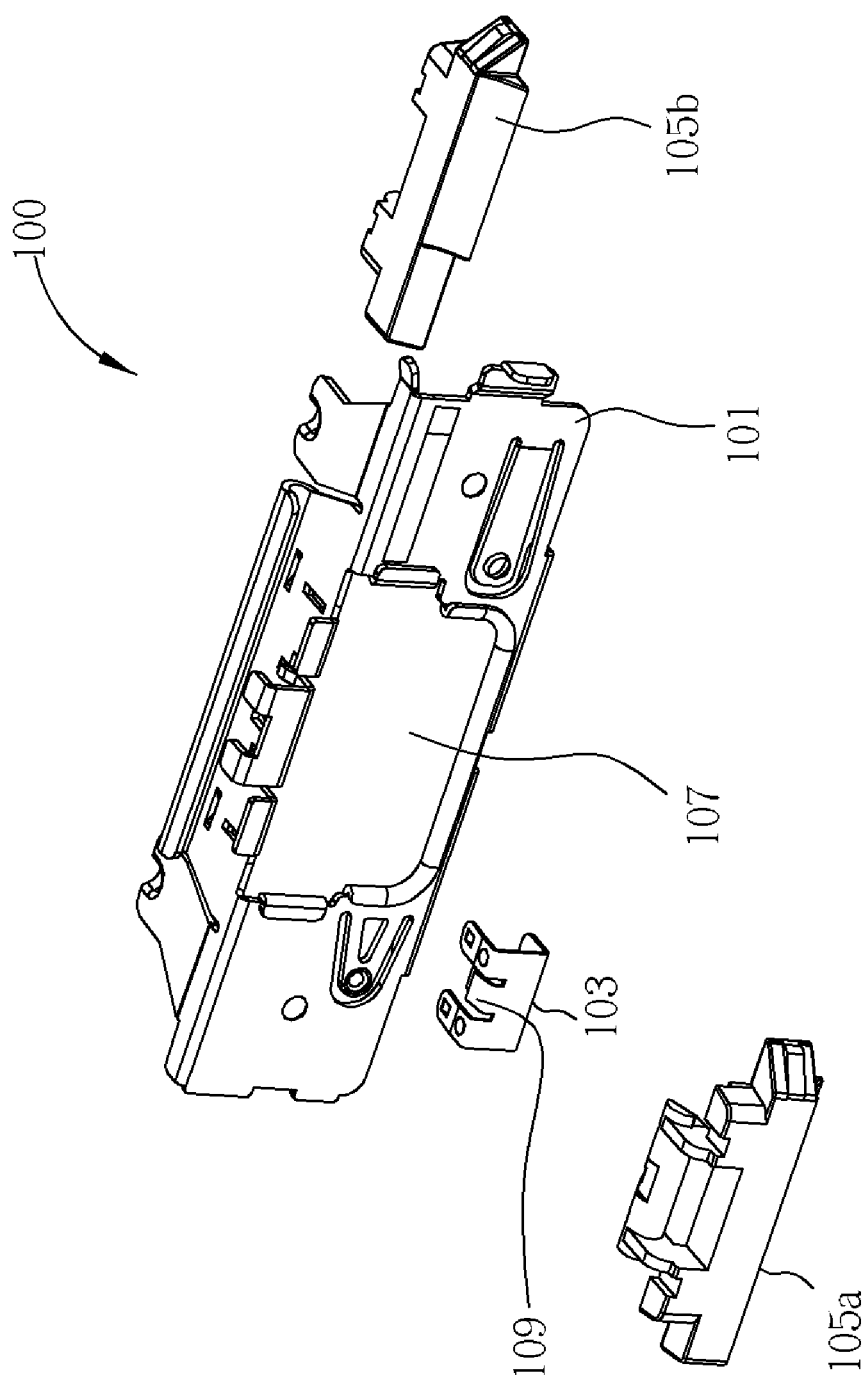
FIG. 1 illustrates an exploded figure of the computer device fixing apparatus according to the present invention.
Figure 3:
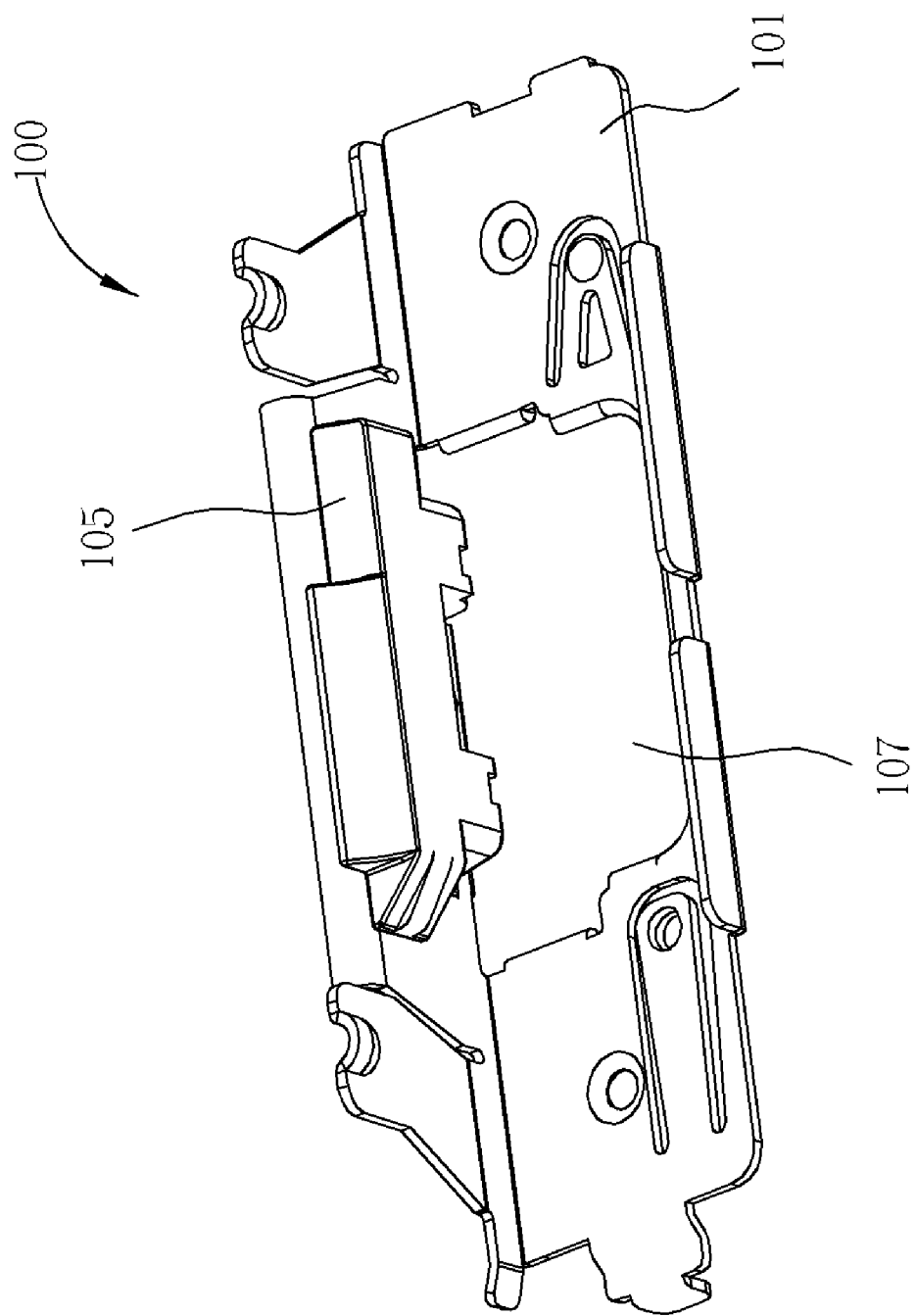
FIG. 3 illustrates a structural diagram when the computer device fixing apparatus is utilized to fix a computer device of a smaller size.
Figure 4:
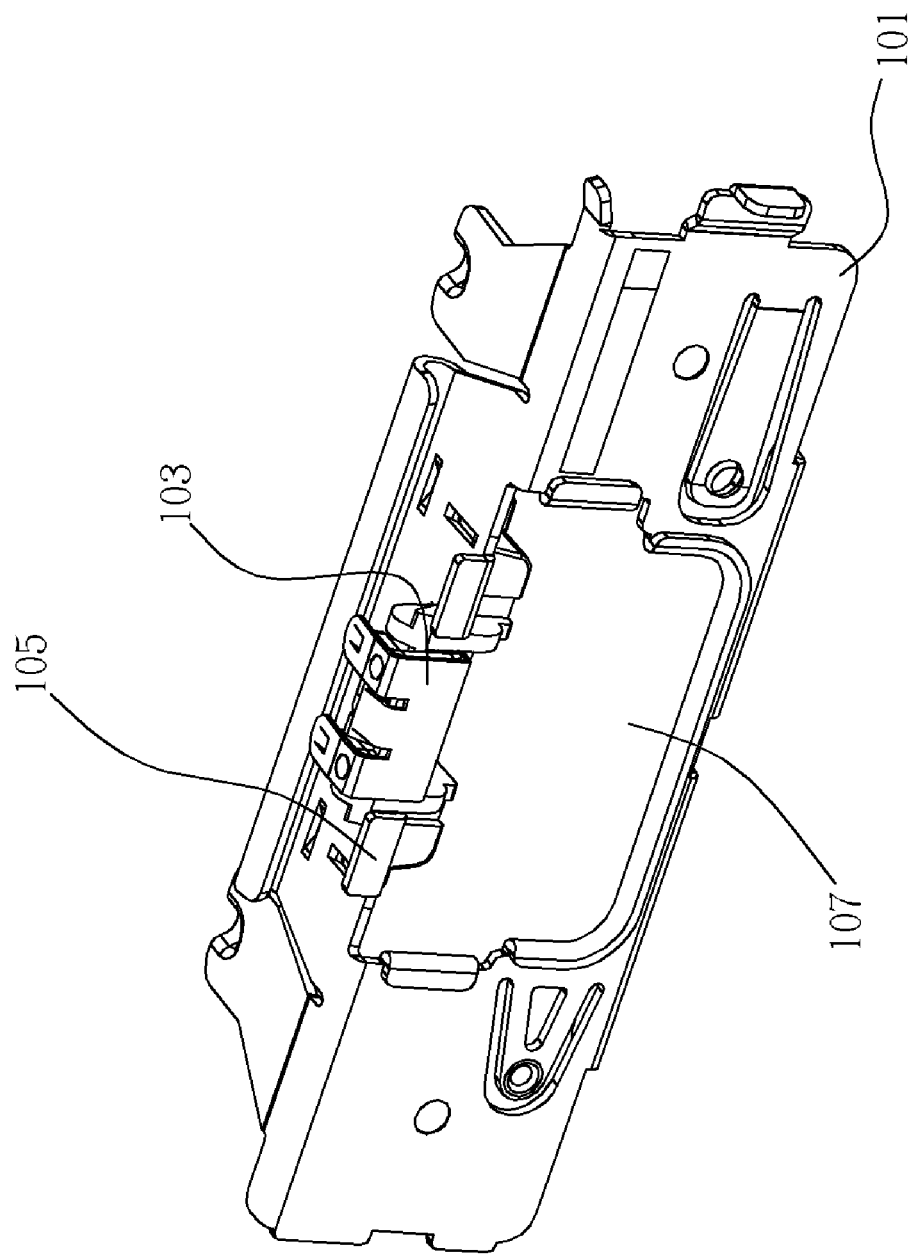
FIG. 4 illustrates a structural diagram of the structure shown in FIG. 3 from another viewpoint.
Figure 5:
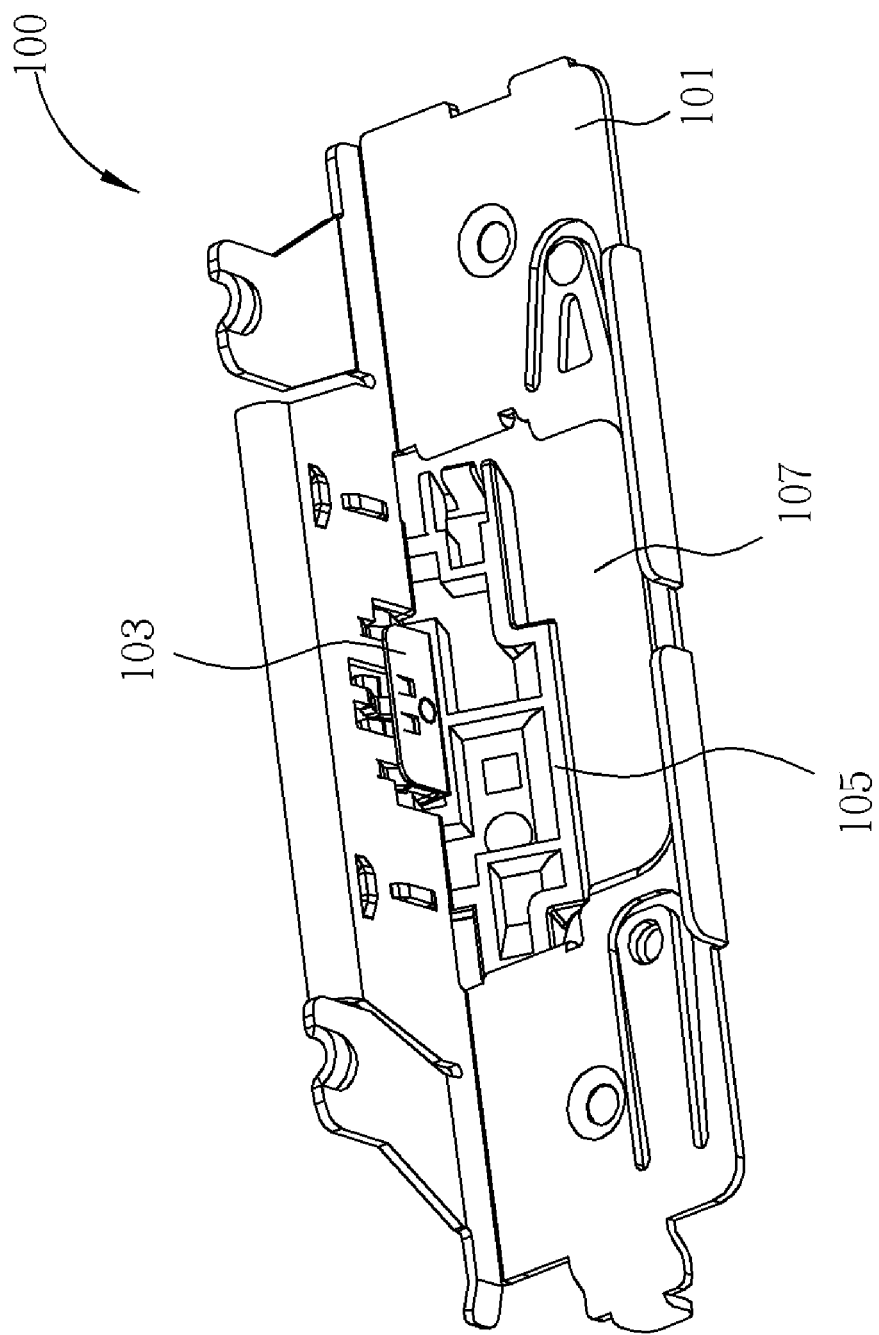
FIG. 5 illustrates a structural diagram when the computer device fixing apparatus according to the present invention is utilized to fix a computer device of a larger size.
Figure 6:
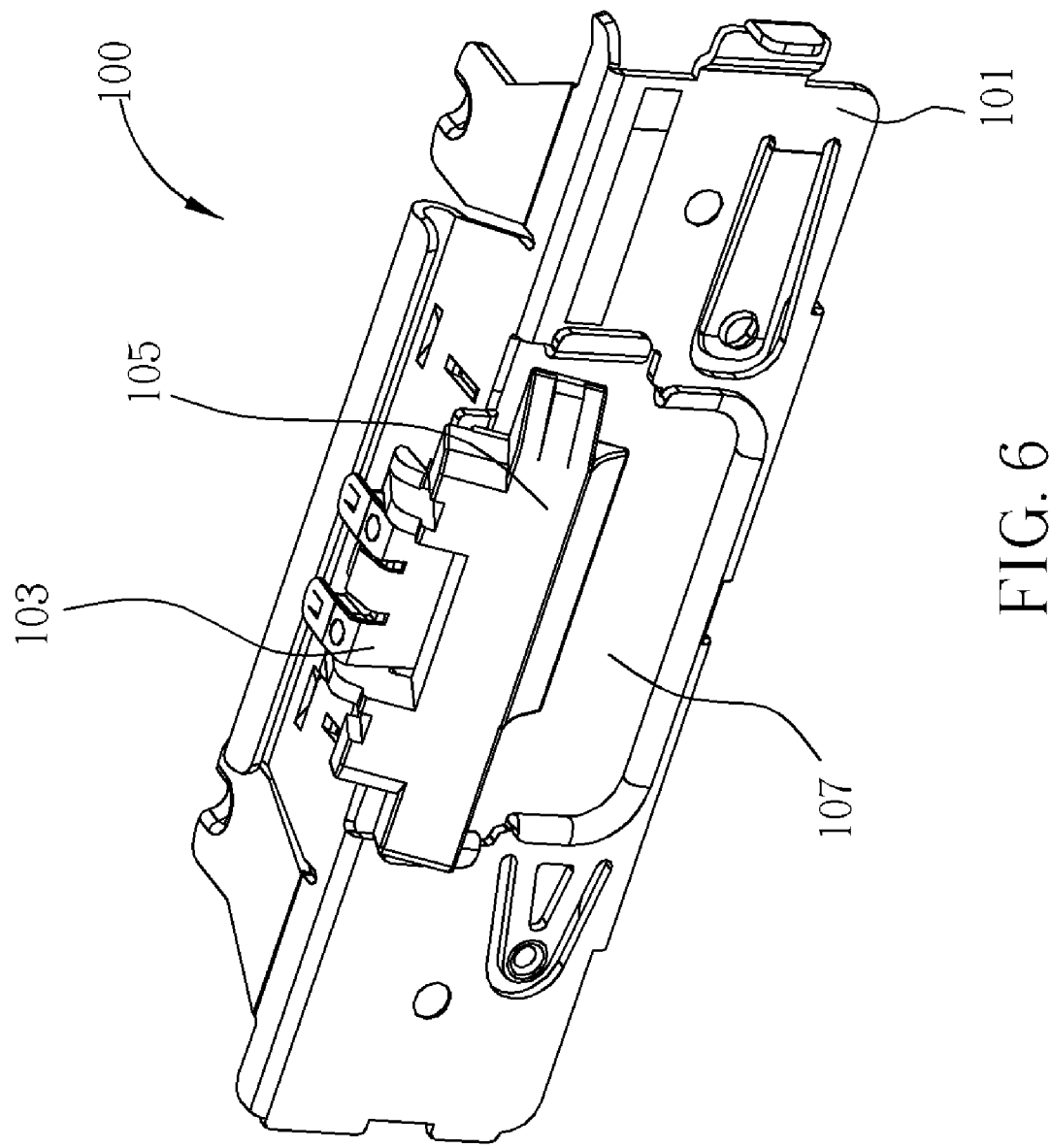
FIG. 6 illustrates a structural diagram of the structure shown in FIG. 5 from another viewpoint.

FIG. 1 illustrates an exploded figure of the computer device fixing apparatus according to the present invention. As shown in FIG. 1, the computer device fixing apparatus 100 includes a main body part 101, a connection mechanism 103, and an adjusting mechanism 105 (105a and 105b indicate that the adjusting mechanism 105 is located in different locations). These components can be made of plastic or metal, according to production and design requirements. The main body part 101 includes a containing part 107. The connection mechanism 103 is used for connecting the main body part 101 and the adjusting mechanism 105, by which the main body part 101 is connected with the adjusting mechanism 103 revolvably. It should be noted that, although the adjusting mechanism 105 is shown as 105a, 105b in FIG. 1, this does not mean that the computer device fixing apparatus 100 is limited to have two adjusting mechanisms, and only indicates the different relations between the main body part 101, the connection mechanism 103 and the adjusting mechanism 105 when the computer device fixing apparatus 100 is used for fixing computer devices of different sizes. That is, FIG. 3 and FIG. 4 are structural diagrams when the computer device fixing apparatus according to the present invention is utilized to fix a computer device with a smaller size. The main body part 101, the connection mechanism 103 and the adjusting mechanism 105 at 105b form the structures shown in FIG. 3 and FIG. 4. Also, FIG. 5 and FIG. 6 are structural diagrams illustrating when the computer device fixing apparatus according to the present invention is utilized to fix a computer device of a larger size. The main body part 101, the connection mechanism 103 and the adjusting mechanism 105 at 105a form the structures shown in FIG. 5 and FIG. 6.

Figure 2:
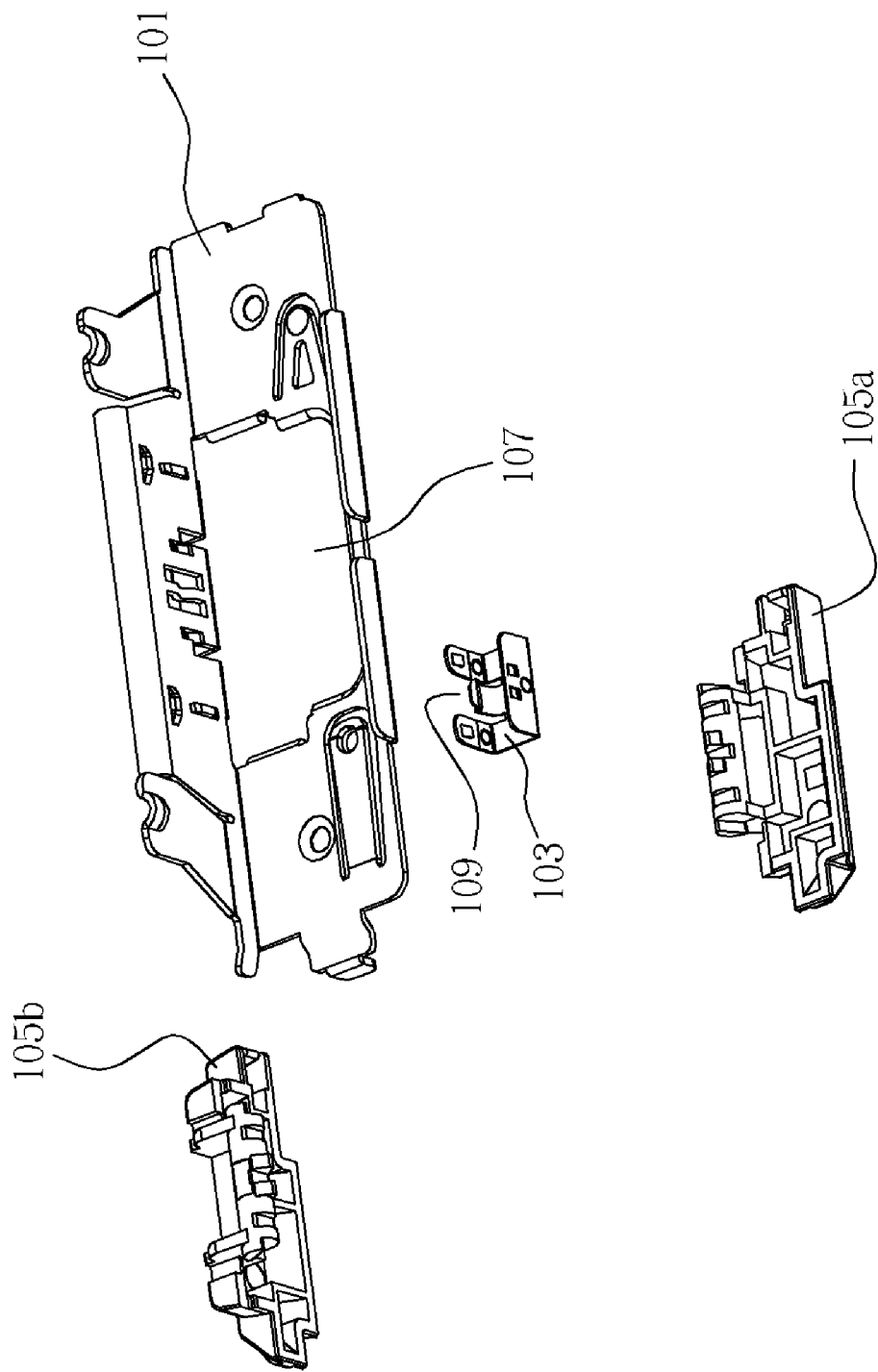
FIG. 2 illustrates an exploded figure of the computer device fixing apparatus from another viewpoint.

FIG. 2 illustrates an exploded figure from another view point of the computer device fixing apparatus according to the present invention, thereby the relation of the components in the computer device fixing apparatus according to the present invention can be clearly reviewed. According to FIG. 1 and FIG. 2, it is clear that the connection mechanism 103 includes a reed (a metal slice) 109, which is used against a rotation axis of the adjusting mechanism 105 when the adjusting mechanism 105 is at different locations (105a, 105b). It should be noted that such a structure is only an example and is not meant to limit the scope of the present invention. Persons skilled in the art can utilize other structures to reach the same function.

FIG. 3 illustrates a structural diagram illustrating when the computer device fixing apparatus according to the present invention is utilized to fix a computer device of a smaller size. FIG. 4 illustrates a structural diagram from another viewpoint of the figure shown in FIG. 3. According to both diagrams, it is clear that the location of the adjusting mechanism 105 (that is, the location 105b in FIG. 1 and FIG. 2) is at a location vertical to the main body part 101 when the computer device fixing apparatus 100 according to the present invention is utilized to fix a computer device of a smaller size. Also, the relations between the main body part 101, the connection mechanism 103 and the adjusting mechanism 105 can be clearly understood via FIG. 4.

FIG. 5 is a structural diagram illustrating when the computer device fixing apparatus according to the present invention is utilized to fix a computer device of a larger size. FIG. 6 is a structural diagram from another viewpoint of the structure shown in FIG. 5. According to both diagrams, it is clear that the location of the adjusting mechanism 105 (that is, the location 105a in FIG. 1 and FIG. 2) is in the containing part 107 when the computer device fixing apparatus 100 according to the present invention is utilized to fix a computer device of a larger size. Also, the relations between the main body part 101, the connection mechanism 103 and the adjusting mechanism 105 can be clearly understood via FIG. 6.

In the embodiments of the present invention, the computer device fixing apparatus is used for fixing a hard disk. The embodiments shown in FIG. 3 and FIG. 4 are used for fixing a hard disk of 2.5 inches, and the embodiments shown in FIG. 5 and FIG. 6 are used for fixing a hard disk of 3.5 inches. These implementations are not meant to limit the scope of the present invention, however, and the computer device fixing apparatus according to the present invention can be utilized for fixing other storage devices or other computer devices. Also, in the above-mentioned embodiments, the computer-fixing device is utilized for fixing the computer device via clutching, but this is also not a limitation of the scope of the present invention, and the computer device fixing apparatus according to the present invention can utilize other methods or structures to fix the computer devices.

It should be noted that the containing part 107 is an open hole in the above-mentioned embodiment, but this is not a limitation of the scope of the present invention. For example, a thin plate thinner than the main body part 101 can be located in the containing part 107, such a structure can also implement the computer device fixing apparatus according to the present invention. Besides, although the adjusting mechanism 105 is vertical with respect to the main body part 101 in FIG. 3 and FIG. 4, the adjusting mechanism 105 can be located at a predetermined position and form a specific angle with the main body part 101, thereby the function of fixing a computer device of a smaller size can also be reached.

Figure 7:
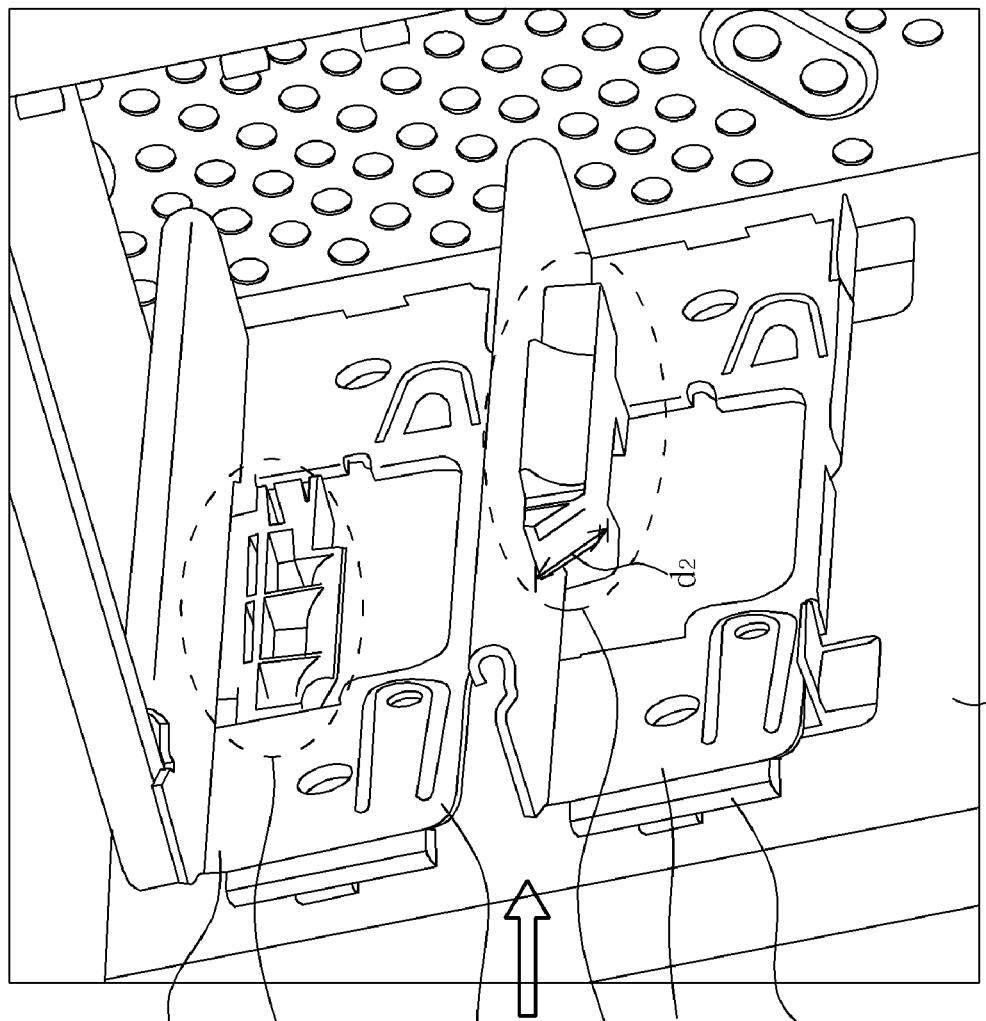
FIG. 7 is a schematic diagram illustrating the computer device fixing apparatus according to the present invention located on the computer case.

FIG. 7 is a schematic diagram illustrating the computer device fixing apparatus according to the present invention located on the computer case. As shown in FIG. 7, the adjusting mechanisms 702 and 704 of the computer fixing apparatuses 701 and 703 are at different locations for fixing computer devices of different sizes. The main body parts 705 and 706 are fixed to the computer case 707 via fixing devices such as screws.

Figure 8:
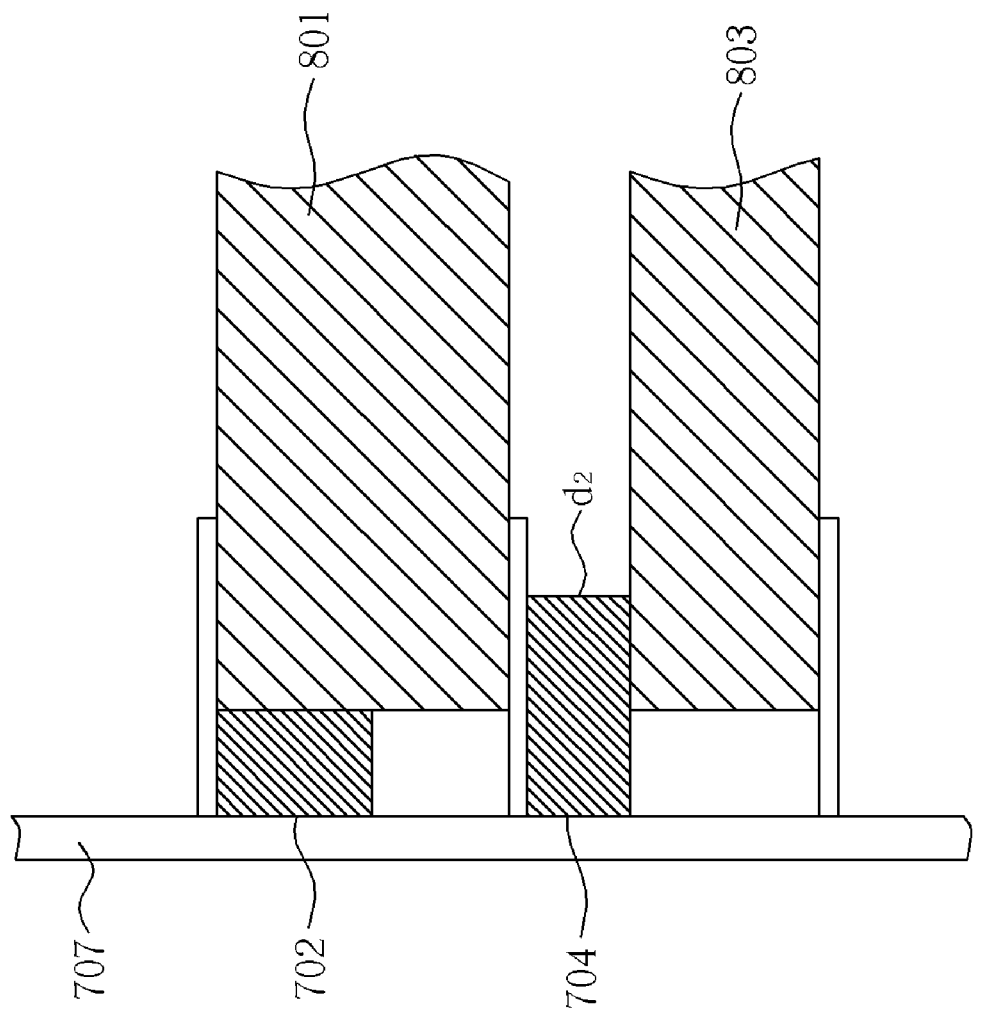
FIG. 8 is a schematic diagram illustrating that the computer device fixing apparatus according to the present invention is utilized for locating computer devices of different sizes.

FIG. 8 is a schematic diagram illustrating that the computer device fixing apparatus according to the present invention is utilized for locating computer devices of different sizes (801 and 803). Please refer to FIG. 7 and FIG. 8 to understand the operation of the computer device fixing apparatus according to the present invention more clearly. FIG. 8 is a schematic diagram illustrating the condition that FIG. 7 is observed from the direction of arrow A. It should be noted that some devices are not illustrated for simplicity. The computer device 801 is a computer device of a larger height, and the computer device 803 is a computer device of a smaller height. The adjusting mechanism 702 is located in the containing part but the adjusting mechanism 704 is not located in the containing part. As shown in FIG. 8, the adjusting mechanism 702 can utilize the thickness d2 to compensate for the height difference of computer devices 801 and 803, such that the computer device fixing apparatus according to the present invention can be utilized to locate computer devices of different sizes.

According to the above-mentioned description, the operation of the computer device fixing apparatus according to the present invention can be shown as follows: the computer device fixing apparatus is used for fixing a computer device of a first size when the adjusting mechanism is rotated to a first location to be in the containing part, but used for fixing a computer device of a second size when the adjusting mechanism is rotated to a second location and not in the containing part. According to this structure, since no screws are used, the probability of shorting computer circuits can decrease, enabling a user to open up the computer easily. Additionally, computer devices of different sizes can be fixed to a computer case via the single computer device fixing apparatus.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A computer device fixing apparatus, comprising:
   a main body part, including a containing part;
   an adjusting mechanism; and
   a connection mechanism, for connecting the main body part and the adjusting mechanism, by which the main body part is rotatably connected with the adjusting mechanism;
   wherein the computer device fixing apparatus is for fixing a computer device of a first size when the adjusting mechanism is located in the containing part, and the computer device fixing apparatus is for fixing a computer device of a second size when the adjusting mechanism is not located in the containing part, the computer device of the first size being a hard disk of 3.5 inches and the computer device of the second size being a hard disk of 2.5 inches.

2. The computer device fixing apparatus of claim 1, being made of metal or plastic.

3. The computer device fixing apparatus of claim 1, wherein the containing part is an open hole of the main body part.

4. The computer device fixing apparatus of claim 1, wherein the adjusting mechanism is vertical to the main body part when the adjusting mechanism is rotated to a second location.

5. The computer device fixing apparatus of claim 1, wherein the computer device is fixed via a clutching means.

6. A computer case, including a computer device fixing apparatus, wherein the computer device fixing apparatus comprises:
- a main body part, located on the computer case and including a containing part;
- an adjusting mechanism; and
- a connection mechanism, for connecting the main body part and the adjusting mechanism, by which the main body part is rotatably connected with the adjusting mechanism;

wherein the computer device fixing apparatus is for fixing a computer device of a first size when the adjusting mechanism is located in the containing part, and the computer device fixing apparatus is for fixing a computer device of a second size when the adjusting mechanism is not located in the containing part, the computer device of the first size being a hard disk of 3.5 inches and the computer device of the second size being a hard disk of 2.5 inches.

7. The computer case of claim 6, wherein the computer device fixing apparatus is made of metal or plastic.

8. The computer case of claim 6, wherein the containing part is an open hole of the main body part.

9. The computer case of claim 6, wherein the adjusting mechanism is vertical to the main body part when the adjusting mechanism is rotated to a second location.

10. The computer case of claim 6, wherein the computer device fixing apparatus fixes the computer device via a clutching means.

* * * * *